United States Patent
Neville

(10) Patent No.: US 6,604,777 B2
(45) Date of Patent: Aug. 12, 2003

(54) COLLAPSIBLE CAMPER

(76) Inventor: Robert Neville, 22 Wentworth Street, Dubbo, New South Wales (AU), 2830

( * ) Notice: Subject to any disclaimer, the term of this patent is extended or adjusted under 35 U.S.C. 154(b) by 0 days.

(21) Appl. No.: 10/105,895

(22) Filed: Mar. 25, 2002

(65) Prior Publication Data

US 2002/0140252 A1 Oct. 3, 2002

(30) Foreign Application Priority Data

Mar. 30, 2001 (AU) .............................................. PR4072

(51) Int. Cl.$^7$ .......................... B60P 3/345; B60R 15/00
(52) U.S. Cl. ....................... 296/164; 296/165; 296/173; 296/169
(58) Field of Search ................... 296/164, 165, 296/156, 171–174, 376, 161

(56) References Cited

U.S. PATENT DOCUMENTS

| | | | | |
|---|---|---|---|---|
| 2,788,238 A | * | 4/1957 | Baird | 296/164 |
| 2,980,465 A | * | 4/1961 | Letzler | 296/164 |
| 3,000,664 A | * | 9/1961 | Martin | 296/164 |
| 3,466,082 A | * | 9/1969 | Branch | 296/164 |
| 3,582,129 A | * | 6/1971 | Frank | 296/164 |
| 3,598,441 A | * | 8/1971 | Damiani | 296/164 |
| 3,658,375 A | * | 4/1972 | Bowen | 296/164 |
| 3,659,893 A | * | 5/1972 | Steele | 296/164 |
| 3,659,894 A | * | 5/1972 | Dodgen et al. | 296/165 |
| 3,680,908 A | * | 8/1972 | Bowen | 296/170 |
| 3,708,199 A | * | 1/1973 | Throssell | 296/164 |
| 3,753,590 A | * | 8/1973 | Couix | 296/161 |
| 3,790,207 A | * | 2/1974 | Anderson | 296/164 |
| 3,850,470 A | * | 11/1974 | Trelle | 296/165 |
| 4,057,284 A | * | 11/1977 | Blank | 296/173 |
| 4,294,484 A | * | 10/1981 | Robertson | 296/164 |
| 4,657,300 A | * | 4/1987 | Penny et al. | 296/173 |
| 4,918,772 A | * | 4/1990 | Haile | 296/169 |
| 5,135,278 A | * | 8/1992 | Kauffman et al. | 296/173 |
| 5,143,417 A | * | 9/1992 | Philley et al. | 296/172 |
| 5,462,330 A | * | 10/1995 | Brown | 296/169 |
| 5,567,003 A | * | 10/1996 | Gill | 296/173 |
| 5,971,471 A | * | 10/1999 | Gardner | 296/165 |
| 5,992,920 A | * | 11/1999 | Bailey et al. | 296/169 |
| 6,007,142 A | * | 12/1999 | Gehman et al. | 296/173 |
| 6,017,080 A | * | 1/2000 | Gill | 296/173 |
| D428,595 S | * | 7/2000 | Salinas | 296/164 |
| 6,135,539 A | * | 10/2000 | Bailey et al. | 296/169 |
| 6,170,502 B1 | * | 1/2001 | Pullen | 296/169 |
| 6,217,106 B1 | * | 4/2001 | Reckner, Jr. | 296/169 |
| 6,283,536 B1 | * | 9/2001 | Muzyka et al. | 296/165 |
| 6,428,079 B1 | * | 8/2002 | Van Dyke | 296/100.06 |
| 2001/0048232 A1 | * | 12/2001 | Thompson et al. | 296/165 |
| 2002/0163221 A1 | * | 11/2002 | Smith | 296/164 |

* cited by examiner

*Primary Examiner*—Kiran Patel
(74) *Attorney, Agent, or Firm*—Jacobson & Johnson

(57) ABSTRACT

There is a camper for a utility vehicle. The camper includes a base frame for fitting into the cargo tray of the utility. There is a pair of bed frames disposed above the base and slidable laterally between inner closed positions substantially within the width of the cargo tray and open positions of use extending outward of the cargo tray sides. There is a roof panel movable between a lower closed position and a raised position of use and a flexible sheet material extending between outer edges of the bed frames and the roof panel. The camper is collapsible for travelling by moving the bed frames and roof panel from the positions of use to the closed positions so that a compact low profile shape is provided which is set substantially within the transverse dimensions of the cargo tray.

5 Claims, 6 Drawing Sheets

COLLAPSIBLE CAMPER

FIELD OF THE INVENTION

This invention relates to mobile shelters. More particularly although not exclusively it discloses an improved form of camper for use on utility vehicles.

BACKGROUND OF THE INVENTION

Existing campers typically comprise structures which are either mounted directly onto a motor vehicle or fitted to a trailer. With motor vehicle mounted campers the structure is rigid and has to be high enough to provide standing room for the occupants. This leads to excessive air resistance and fuel consumption when travelling as well as instability in crosswinds. While in the case of trailer campers it is known to provide structures which are collapsible down to a low profile there are still the well known disadvantages associated with towing such as steering difficulties during braking and reversing.

SUMMARY OF THE INVENTION

It is therefore an object of this invention to ameliorate the aforementioned disadvantages and accordingly a camper is disclosed for a utility vehicle or the like, said camper including a base frame adapted for mounting in the cargo tray of said utility, a pair of bed frames disposed above said base frame and slidable laterally relative thereto between inner closed positions substantially within the width of said tray and open positions of use extending outward of the tray sides, a roof panel movable between a lower closed position and a raised position of use and flexible sheet material extending between outer edges of said bed frames and said roof panel, the camper being collapsible for travelling by moving said bed frames and roof panel from said positions of use to said closed positions whereby a compact low profile shape is provided which is set substantially within the transverse dimensions of said cargo tray.

Preferably the roof panel is supported by corner poles which are longitudinally collapsible and removably attached to said bed frames.

It is further preferred that said corner poles include a cable system for moving said roof panel between said lower closed position and said raised position.

BRIEF DESCRIPTION OF THE DRAWINGS

The currently preferred embodiment of this invention will now be described with reference to the attached representations in which.

DETAILED DESCRIPTION OF THE PREFERRED EMBODIMENT

Figure 1:
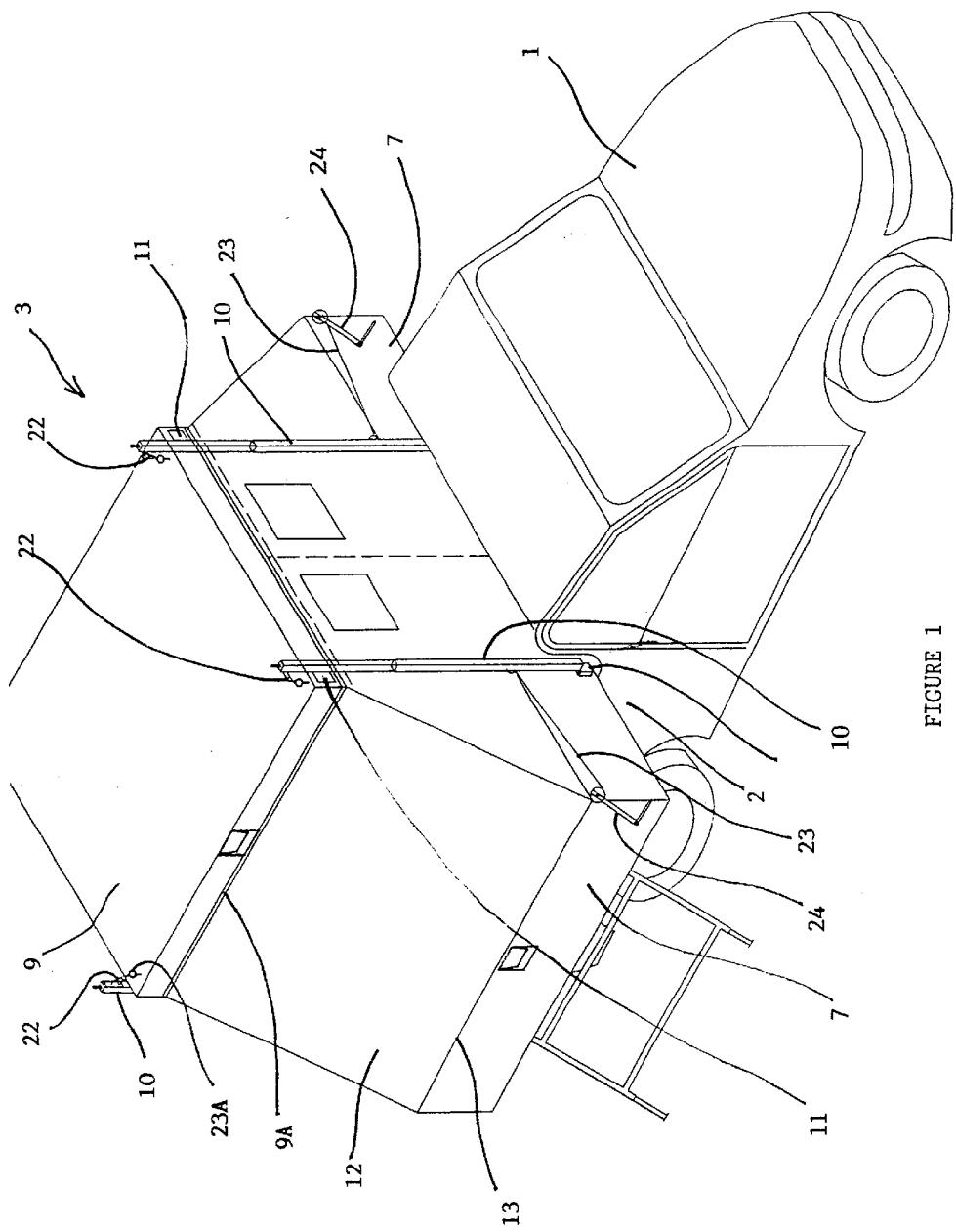
FIGS. 1 and 2 are schematic perspective and rear elevation views of a camper according to this concept fitted to a utility and open for use.
Figure 2:
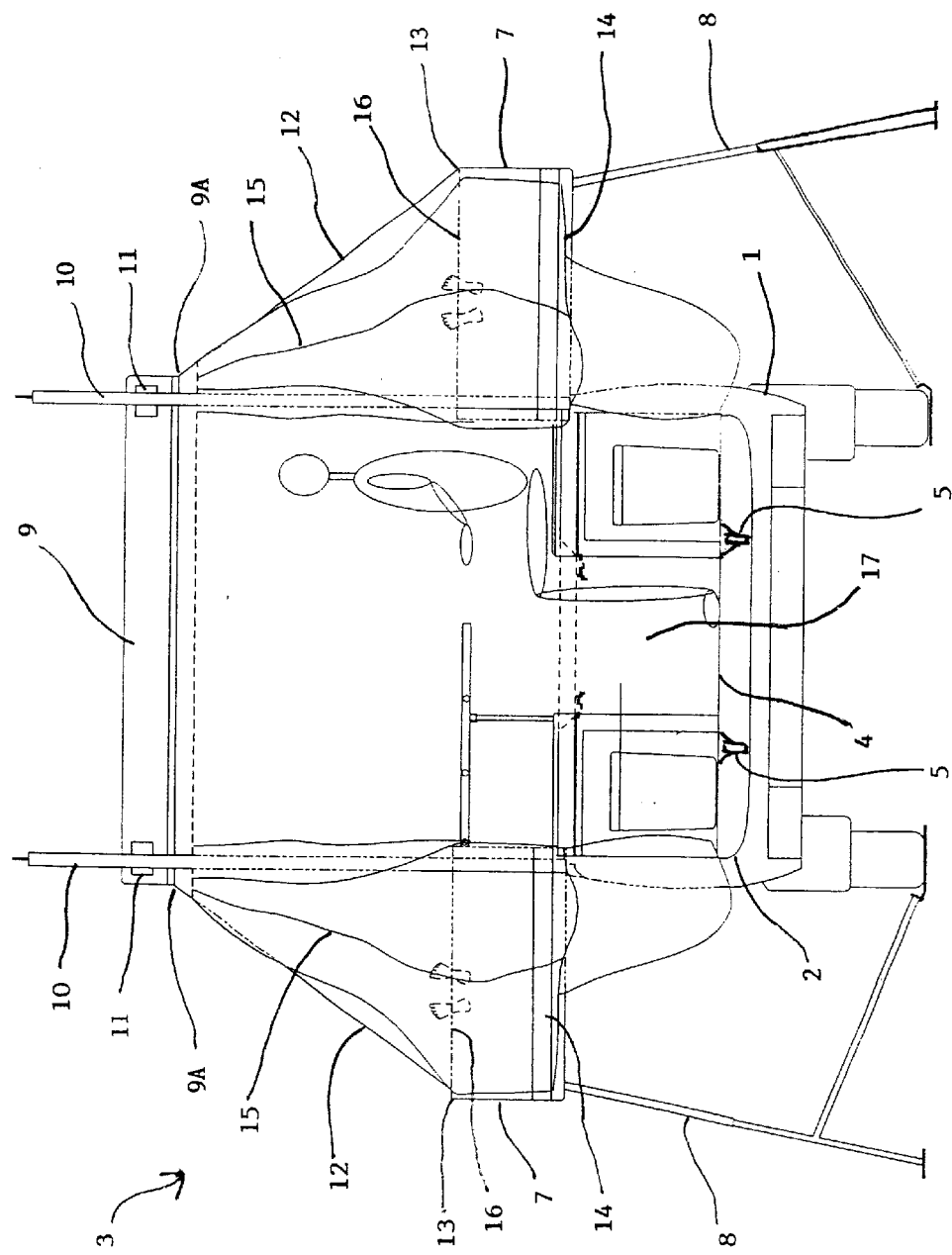
Figure 3:
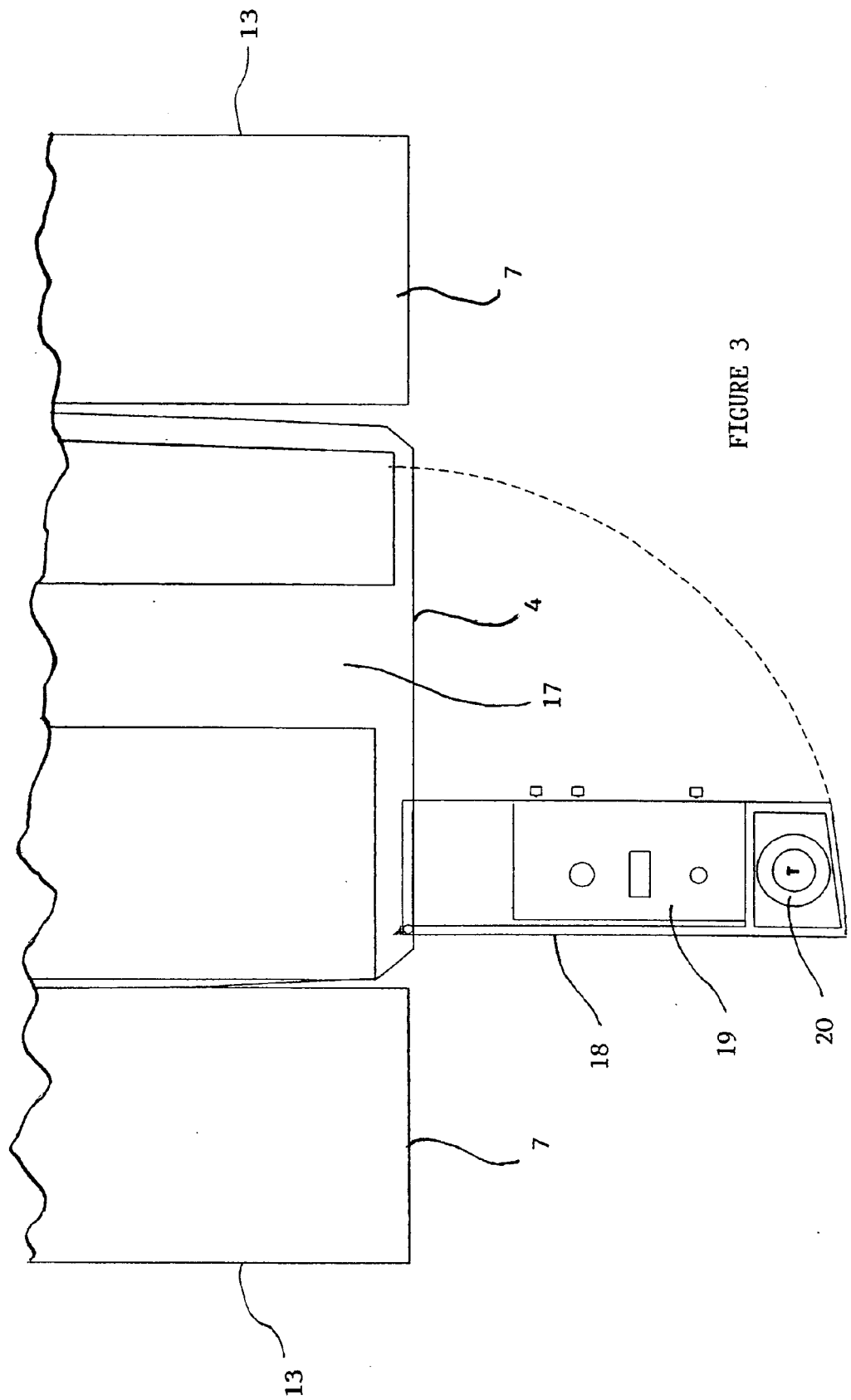
FIG. 3 is a partial plan view of the rear of the camper showing the cooking bench.

Referring first to FIGS. 1 to 5 there is a conventional utility vehicle 1 with a cargo tray 2 at the rear. The camper, indicated generally as 3, is mounted on the utility by fitting the central base frame 4 into the cargo tray. The shape of this frame 4 is adapted to match the inside of the cargo tray and includes appropriate recesses for the wheel arches etc. There may also be removable transport wheels 5 fitted to the bottom of the frame. The height of the base frame 4 and the tracks 6 are selected so that bed frames 7 are slidable on said tracks out to each side of the cargo tray where they rest on telescoping props 8 hinged to the underside of each bed frame. There is a rectangular roof panel 9 which is supported on four telescoping vertical poles 10 removably attached adjacent to the inboard corners of the bed frames using brackets 11. A flexible weatherproof sheet material 12 forms the walls of the camper by extending down from the sides 9A of the roof panel and attaching to both the outer side edges 13 of the bed frames and the front and back edges 14. The rear wall section 15 is zippered so that it can be opened to provide access to the inside of the camper as shown in FIG. 2. There are mattresses 16 placed in each bed frame for sleeping which may for example be 250 mm in depth, 750 mm in width and 1875 mm in length. With this embodiment the middle sections 6A of the tracks are removable after the camper is opened so that the central interior area 17 becomes available for daytime activities such as eating etc. For cooking purposes a bench 18 may be hinged to the rear of the base frame. This bench mounts a stove 19 of any suitable design and a gas bottle 20 if required. The bench swings out as illustrated in FIG. 3 for cooking and access to the camper.

The construction of the base and bed frames would be well within the capabilities of a person skilled in the art using known technology. With the present embodiment the base frame, bed frames and roof panel are preferably constructed from 20×20×1.6 mm rolled hollow steel sections and the external sides are formed by 1 mm thick galvanised sheet metal as shown. The specific arrangement of the internal members is not an essential feature of the invention and various other designs could be used.

The frames with this embodiment have been constructed from steel to provide the strength to mount either a half or full length roof rack or roof bars on top. This would enable the user to carry light items such as fishing rods, bicycles, a spare wheel or a light aluminium dingy. The invention however also extends to the use of aluminium frames for lightweight campers where no load carrying is required.

The poles 10 are preferably collapsible and are removably attached to the inboard corners of the bed frames 4 using any suitable form of clamp 21. Pulleys 22 are fitted adjacent the top of the poles and cables 23 extend up from winding shafts at each side. The cables pass through the pulleys and attach to eyebolts 23A at corners of the roof panel 9. To elevate the roof panel the winding shafts are turned by hand cranks 24 in a direction to take up the cables. With the current embodiment this cable arrangement enables the roof panel 9 to be lifted to a clear interior height of 1.9 metres above the camper floor. This promotes a feeling of spaciousness within the enclosed space and also permits the camper to be very compact when closed up. Rotation in the reverse direction serves to lower the roof panel.

Figure 4:
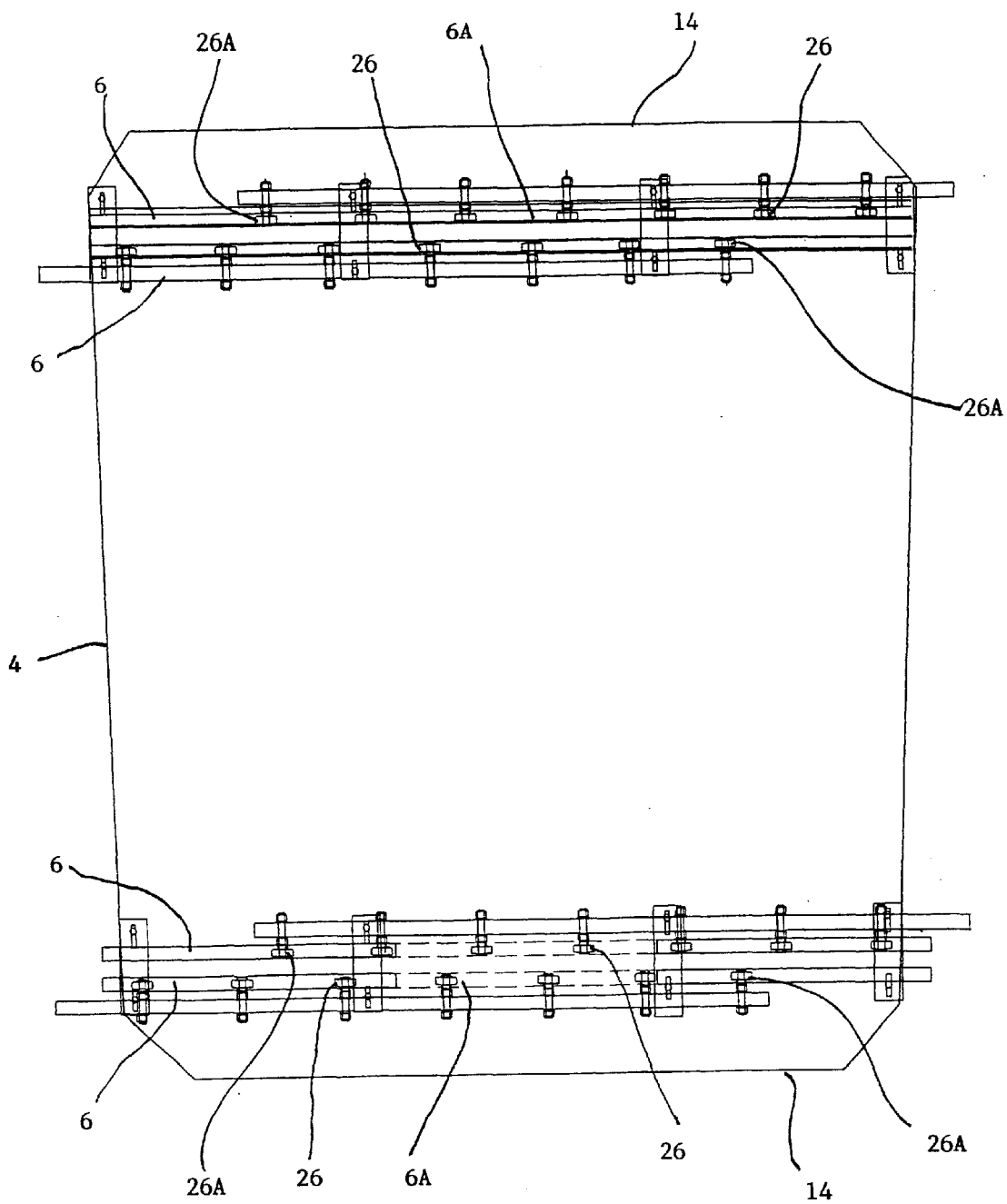
FIG. 4 is a schematic plan view of the base frame showing the preferred arrangement of the tracks for the bed frames.
Figure 5:
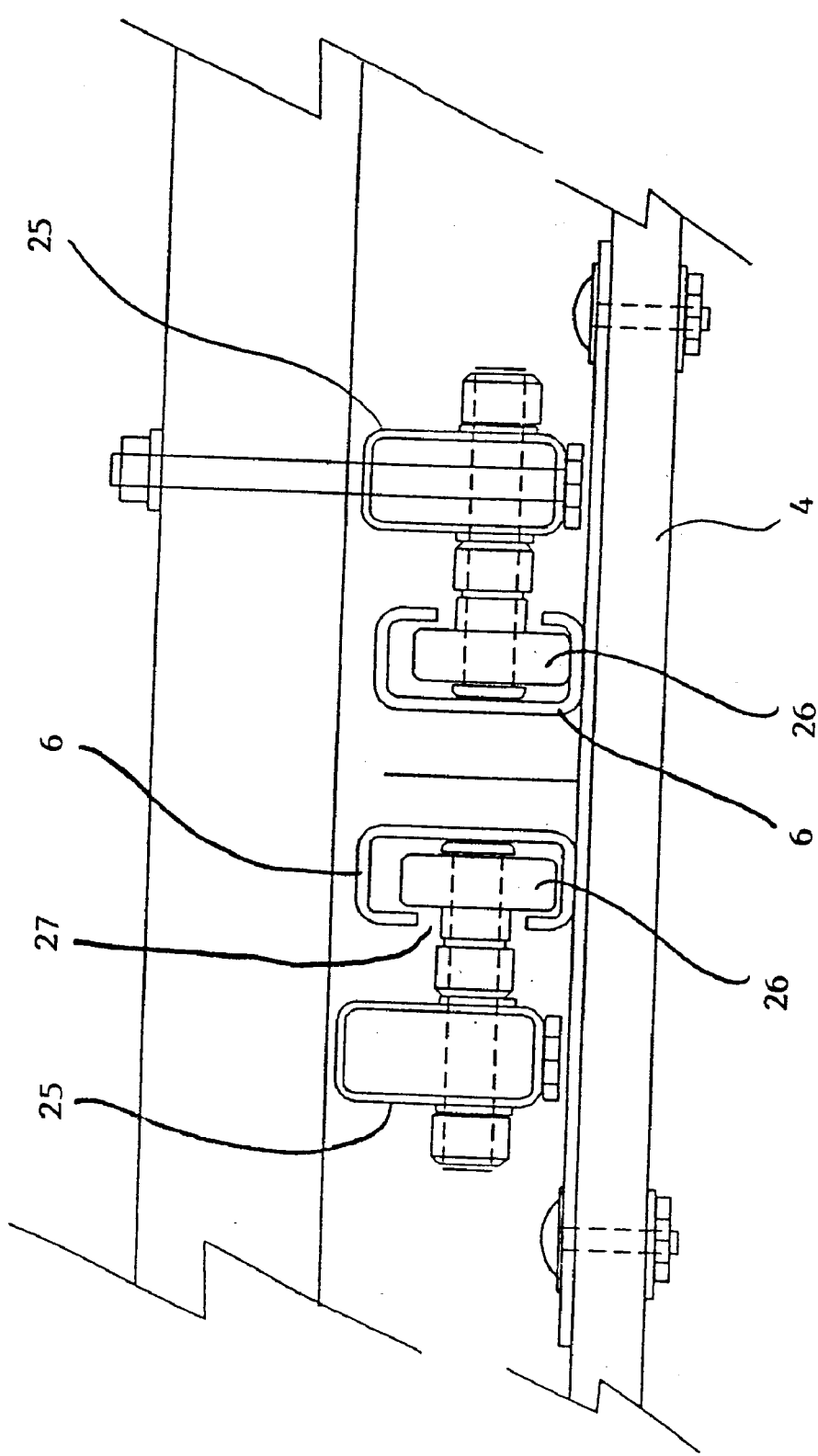
FIG. 5 shows a cross-section of the tracks.

The preferred arrangement for the tracks is best shown in FIGS. 4 and 5. There are runners 25 attached to the bed frames 7 with wheels 26 extending laterally through side slots 27 in each track. The tracks are bolted across the base frame 4 as shown in FIG. 4. Preferably the innermost wheel 26A of each runner makes contact with and runs along the top side of its associated track to counteract the weight of the bed frame at said frame tilts when extended past the point of balance. It is this contact which keeps the bed frames stable when fully extended.

With the bed frames 7 deployed and the roof panel 9 elevated as shown in FIGS. 1 and 2 a servicable and weatherproof structure is provided for short term or overnight shelter. With the currently preferred example shown the available interior width is over 3 metres, the interior height is 1.9 metres and the ceiling area is 1.8 by 1.5 metres.

Figure 6:
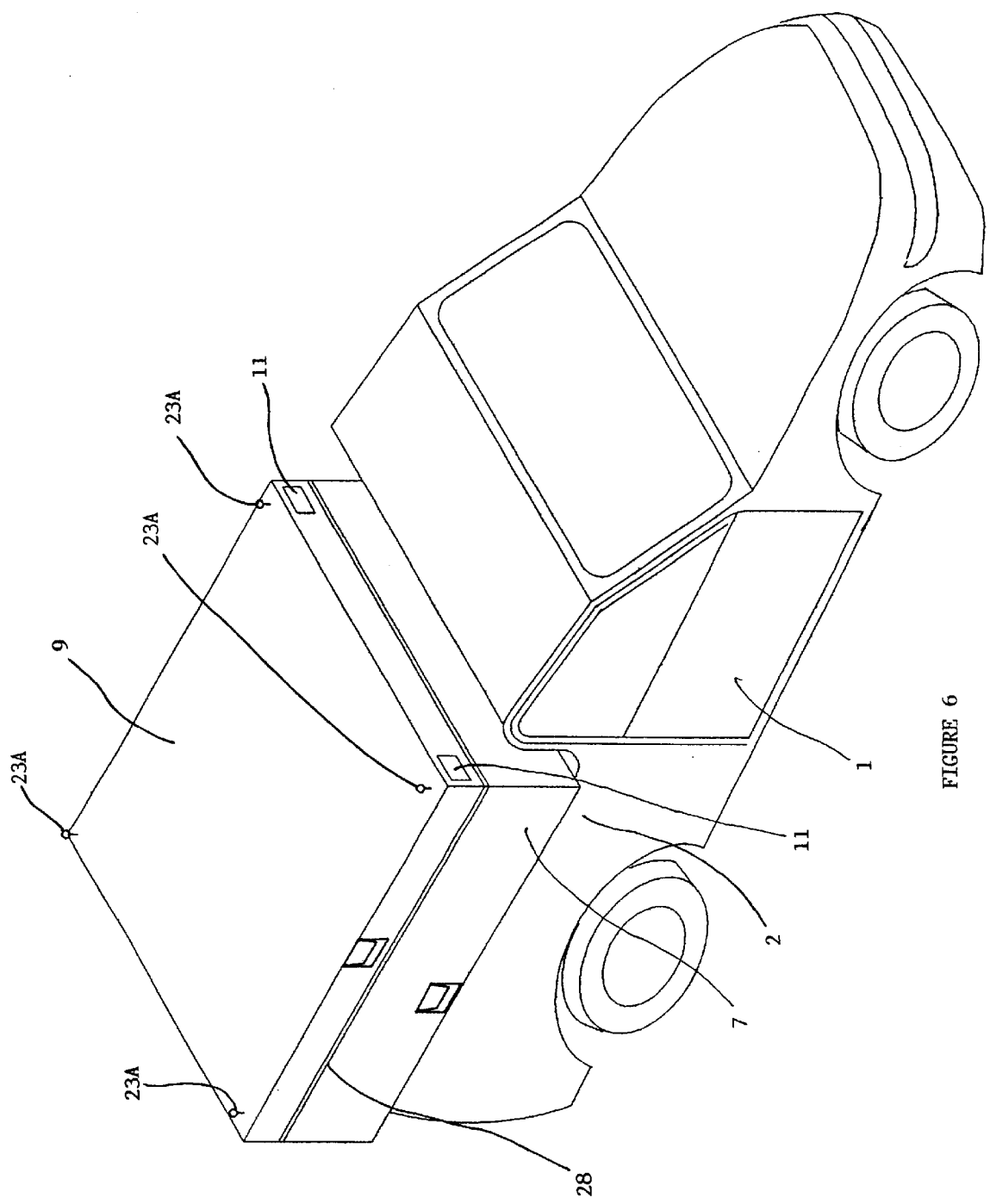
FIG. 6 is a perspective view of the camper of FIG. 1 when collapsed for travelling.

For travelling the camper is closed by first winding down the roof panel using the aforementioned crank handles. The roof poles are then removed, collapsed and placed inside the base frame. The support props are folded up against the undersides of the bed frames, the centre track sections installed and the bed frames slid inwardly until their inner facing sides meet. Any suitable form of latch may be used to hold the bed frames in place. Finally the cooking bench is closed into the back of the cargo tray and the rear tailgate of the utility is shut. Preferably a waterproof seal 28 is fitted around the underside of the roof panel to engage the top of the bed frames. The result as shown in FIG. 6 is a compact low profile shape which sits squarely over the cargo tray and is less than the overall width of the vehicle. Wind resistance when travelling is thus minimised and the relatively low center of gravity ensures better vehicle control than with conventional rigid structure campers.

While the camper has been illustrated in conjunction with a utility vehicle it can also be erected and used as an off-vehicle shelter. When users are staying in one location for an extended period they can erect the camper on the ground thus freeing the vehicle for other purposes. It is envisaged that the camper could be used in this manner as temporary additional accomodation at the user's home or a temporary site or emergency office.

It will thus be appreciated that this invention at least in the form of the embodiment disclosed provides a novel and improved camper. Clearly however the example described is only the currently preferred form of the invention and a wide variety of modifications may be made which would be apparent to a person skilled in the art. For example the shape, configuration and method of constructing the frame assemblies and roof panel may be changed according to the type of utility vehicle being fitted. Also, while cables and hand cranks are currently proposed to raise and lower the roof panel other mechanical, electrical or hydraulic mechanisms may be used. The invention is also not restricted to any specific materials although rolled hollow steel sections are preferred for the internal structural members and sheet metal for the frame sides and roof panel.

What is claimed is:

1. A camper for a utility vehicle, said camper including a base frame for fitting into the cargo tray of said utility vehicle, a pair of bed frames disposed above said base frame and slidable laterally relative thereto between inner closed positions substantially within the width of said cargo tray and open positions of use extending outward of the cargo tray sides, a roof panel movable between a lower closed position and a raised position of use and flexible sheet material extending between outer edges of said bed frames and said roof panel, the camper being collapsible for traveling by moving said bed frames and roof panels from said positions of use to said closed positions whereby a compact low profile shape is provided which is less than the overall width of the utility vehicle and said bed frames being slidable on tracks between said inner closed positions and said open positions of use with middle sections of said tracks being removable or displaceable when the bed frames are at said open positions of use and said roof panel being rectangular and supported at said raised position of use by corner poles removably attached adjacent inboard corners of said bed frames wherein said corner poles include a cable system for moving the roof panel between said lower closed position and said raised position of use, the cable system including pulleys fitted at or adjacent the tops of said poles and cables extending up from winding shafts at each side of the camper, said cables passing through the pulleys and attaching to said roof panel whereby rotation of said winding shafts in one direction raises said roof panel and rotation of said winding shaft in the opposite direction lowers said roof panel.

2. The camper as claimed in claim 1 wherein said tracks are disposed across the base frame and there are runners attached to the bed frames with wheels extending laterally through side slots in the tracks.

3. The camper as claimed in 2 wherein transport wheels are fitted to the underside of the base frame.

4. The camper as claimed in claim 3 wherein a bench is hinged to the rear of said base frame.

5. The camper as claimed in claim 4 wherein the bed frames when at said open positions of use rest on props hinged to the underside of said bed frames.

* * * * *